United States Patent
Ju et al.

(10) Patent No.: US 10,630,477 B1
(45) Date of Patent: Apr. 21, 2020

(54) EFFICIENT THRESHOLD DISTRIBUTED ELLIPTIC CURVE KEY GENERATION AND SIGNATURE METHOD AND SYSTEM

(71) Applicant: Blue Helix, Grand Cayman (KY)

(72) Inventors: Jianhua Ju, Beijing (CN); Kai Wen, Beijing (CN); Kailiang Jiang, Beijing (CN); Yuqi Lin, Beijing (CN)

(73) Assignee: Blue Helix (KY)

(*) Notice: Subject to any disclaimer, the term of this patent is extended or adjusted under 35 U.S.C. 154(b) by 0 days.

(21) Appl. No.: 16/523,505

(22) Filed: Jul. 26, 2019

(30) Foreign Application Priority Data

Dec. 27, 2018 (CN) .......................... 2018 1 1610503

(51) Int. Cl.
*H04L 9/30* (2006.01)
*H04L 9/32* (2006.01)
*H04L 9/00* (2006.01)
*H04L 9/08* (2006.01)

(52) U.S. Cl.
CPC ............ *H04L 9/3073* (2013.01); *H04L 9/008* (2013.01); *H04L 9/085* (2013.01); *H04L 9/0894* (2013.01); *H04L 9/3252* (2013.01)

(58) Field of Classification Search
CPC ..... H04L 9/3073; H04L 9/008; H04L 9/0894; H04L 9/3252
See application file for complete search history.

(56) References Cited

U.S. PATENT DOCUMENTS

| | | | | |
|---|---|---|---|---|
| 5,315,658 A | * | 5/1994 | Micali ................... | G06Q 20/00 380/28 |
| 5,625,692 A | * | 4/1997 | Herzberg ................ | H04L 9/085 380/286 |
| 6,026,163 A | * | 2/2000 | Micali ................... | G06Q 20/085 380/286 |
| 7,327,847 B2 | * | 2/2008 | Cachin ................... | H04L 9/085 380/286 |
| 8,024,274 B2 | * | 9/2011 | Parkes ............... | G06Q 20/0855 705/26.3 |
| 8,316,237 B1 | * | 11/2012 | Felsher ................. | H04L 9/0825 380/282 |
| 8,566,247 B1 | * | 10/2013 | Nagel ................... | H04L 63/045 380/270 |
| 8,731,203 B2 | * | 5/2014 | D'Souza ................ | H04L 9/085 380/277 |

(Continued)

OTHER PUBLICATIONS

Google search history obtained by Sharon Lynch on Oct. 11, 2019.*
Search Query Report for IP.com (performed Feb. 21, 2020).*

*Primary Examiner* — Sharon S Lynch
(74) *Attorney, Agent, or Firm* — Burke, Williams & Sorensen, LLP

(57) ABSTRACT

Threshold distributed elliptic curve key generation and signature system and method are disclosed where nodes can generate their own key pairs without the participation of a trust center, each node can process its own key pair according to a secret sharing protocol, complete conversion of the (n, n) threshold to the (t, n) threshold, after determining t signature node, generates a (t, t) threshold private key according to a threshold logic, complete mapping of ptki to ptki', and according to a signature logic, use ptki' to complete the communication and calculation in the signature protocol, store the relevant calculation results, and complete an overall signature.

7 Claims, 5 Drawing Sheets

(56) References Cited

U.S. PATENT DOCUMENTS

| | | | | |
|---|---|---|---|---|
| 8,904,181 B1* | 12/2014 | Felsher | H04L 9/0825 | 380/282 |
| 8,958,555 B2* | 2/2015 | Gentry | H04L 9/008 | 380/44 |
| 8,983,075 B2* | 3/2015 | D'Souza | H04L 9/085 | 380/277 |
| 9,106,408 B2* | 8/2015 | Takashima | H04L 9/3073 | |
| 9,130,757 B2* | 9/2015 | Fazio | H04L 9/3218 | |
| 9,219,730 B2* | 12/2015 | D'Souza | H04L 9/085 | |
| 9,419,951 B1* | 8/2016 | Felsher | H04L 9/0825 | |
| 9,449,177 B1* | 9/2016 | El Defrawy | G06F 21/60 | |
| 10,396,984 B2* | 8/2019 | French | G09C 1/00 | |
| 2006/0098814 A1* | 5/2006 | Al-Khoraidly | G06F 7/725 | 380/28 |
| 2008/0034203 A1* | 2/2008 | Camnisch | G06Q 20/383 | 713/156 |
| 2009/0187757 A1* | 7/2009 | Kerschbaum | G06Q 10/10 | 713/153 |
| 2011/0202766 A1* | 8/2011 | Lerner | H04L 9/002 | 713/168 |
| 2012/0221421 A1* | 8/2012 | Hammad | G06Q 10/00 | 705/16 |
| 2013/0085916 A1* | 4/2013 | Abbe | G06Q 40/06 | 705/35 |
| 2013/0212393 A1* | 8/2013 | D'Souza | H04L 9/085 | 713/171 |
| 2013/0322627 A1* | 12/2013 | Takashima | H04L 9/3073 | 380/255 |
| 2014/0189792 A1* | 7/2014 | Lesavich | H04L 63/10 | 726/3 |
| 2014/0351104 A1* | 11/2014 | Abbe | G06Q 40/06 | 705/30 |
| 2015/0149769 A1* | 5/2015 | D'Souza | H04L 9/085 | 713/156 |
| 2015/0379301 A1* | 12/2015 | Lesavich | G06F 16/182 | 726/28 |
| 2016/0321654 A1* | 11/2016 | Lesavich | G06F 21/6245 | |
| 2017/0134158 A1* | 5/2017 | Pasol | H04L 9/008 | |
| 2017/0250796 A1* | 8/2017 | Samid | H04L 9/0838 | |
| 2018/0109831 A1* | 4/2018 | Smith | H04N 21/2541 | |
| 2019/0164153 A1* | 5/2019 | Agrawal | G06Q 20/383 | |
| 2019/0297062 A1* | 9/2019 | Chaum | H04L 63/0421 | |

* cited by examiner

EFFICIENT THRESHOLD DISTRIBUTED ELLIPTIC CURVE KEY GENERATION AND SIGNATURE METHOD AND SYSTEM

CROSS REFERENCE TO RELATED PATENT APPLICATIONS

This disclosure claims priority to Chinese Patent Application No. CN201811610503.5, entitled "An Efficient Threshold Distributed Elliptic Curve Key Generation and Signature Method and System" filed Dec. 27, 2018, herein incorporated by reference.

TECHNICAL FIELD

The present invention relates to the field of cryptography, and in particular to a distributed elliptic curve key generation and signature technique.

BACKGROUND

Elliptic curve cryptography (ECC) is an approach to public-key cryptography based on the algebraic structure of elliptic curves over finite fields. ECC generally requires shorter keys compared to non-EC cryptography and can provide equivalent or higher levels of security. Elliptic curve digital signature algorithm (ECDSA) offers a variant of the digital signature algorithm (DSA) which uses ECC. ECDSA is widely used in distributed blockchain network. For example, Bitcoin, Ethereum and other digital currencies use this algorithm to sign and verify the legality of transactions.

The field of threshold cryptosystem is a cryptographic technique based on secret sharing technology. The basic idea behind threshold cryptosystem is to divide the key K into n shares (k1, k2, . . . , kn) according to a secret sharing protocol. If any X ($t \leq X \leq n$) ki values are known, K can be calculated; if less than any tki values are known, K cannot be calculated due to the lack of information. This method is generally called the (t,n) threshold method. The two secret sharing protocols currently widely used are the Shamir secret sharing protocol (SSP) and the Asmuth-Bloom SSP. The Shamir SSP is based on the Lagrange interpolation formula, while the Asmuth-Bloom SSP is based on the Chinese remainder theorem.

Homomorphic encryption (HE) is a special encryption method, which allows operating on the ciphertext to get an encrypted result. That means the result obtained by directly operating on the ciphertext matches the result of encrypting the operation result of operating on the plaintext. From the perspective of abstract algebra, HE maintains homomorphism. According to the type of operation. HE is generally divided into additive homomorphism, multiplicative homomorphism, subtraction homomorphism, and division homomorphism. Simultaneously satisfying the additive homomorphism and the multiplicative homomorphism means algebraic homomorphism that is full homomorphism. Simultaneously satisfying the four kinds of homomorphism means arithmetic homomorphism. With the current encryption algorithms, the RSA algorithm is a kind of multiplicative homomorphism, the Paillier algorithm is a kind of additive homomorphism, and the Gentry algorithm is a kind of full homomorphism.

SUMMARY OF DISCLOSURE

The embodiments of the present disclosure provide efficient threshold distributed elliptic curve key generation and signature system and method of using the same thereof.

In one embodiment, a threshold distributed elliptic curve key generation and signature method includes: generating, by each of n nodes via one or more generation modules of a computing network, a public-private key pair (puki, ptki) independently without the participation of a trust center, where puki is a public key, ptki is a private key, and i is a node number. Next, processing, by each node via one or more conversion modules of the computing network, the public-private key pair according to a secret sharing protocol to complete the conversion of a (n, n) threshold to a (t, n) threshold. This is followed by a generating step, by each signature node via one or more mapping modules of the computing network, a private key of (t, t) threshold according to a threshold logic to complete a mapping of ptki to ptki' after determination of t signature nodes. Last but not least, completing, by each node via one or more signature modules of the computing network, communication and calculation of that node in a signature protocol with ptki' according to a signature logic, and storing a result of the calculation and completing an overall signature.

In one embodiment, in the processing step, to complete the conversion of a (n, n) threshold to a (t, n) threshold includes the steps of: generating, by each node, the public-private key pair independently according to a rule of elliptic curve, broadcasting, by each node, its public key puki to other nodes, and combining n public keys pukx into a complete public key PUK according to an elliptic curve operation after receiving the public keys pukx broadcasted by other n−1 nodes, performing, by each node, the (t, n) threshold processing on its private key ptki according to the secret sharing protocol to map ptki to n segments ptkij, and sending ptkij to a corresponding node numbered j, and selecting t available nodes, when a signature is performed, and recovering, by each of the t available nodes, the received n ptkij according to a recovery method of the selected secret sharing protocol to obtain ptki'.

In some embodiments, the secret sharing protocol is Shamir protocol or Asmuth-Bloom protocol.

In one embodiment, in the completing step, completing the overall signature includes the steps of: generating, by each of the n nodes on the computing network, a public-private key pair (HEpuki, HEptki) for homomorphic encryption by adopting a unified homomorphic encryption algorithm HE according to a distributed signature algorithm, where HEpuki is a public key, HEptki is a private key, and i is a node number, converting, by all nodes, information that cannot be directly disclosed in a calculation process to publicly available information by using a unified secret transform function Fconv according to the calculation process of an elliptic curve signature algorithm, performing, by each node, the function Fconv and sending a result to a corresponding node after the information has been converted, and receiving information from other nodes, recording, by each node, information in the performing step, the function Fconv that is not related to the signed information but is used in the signature generation, according to a flow of the elliptic curve signature algorithm, and maintaining, by each node, a unified view number v, repeating the steps of converting information, performing the function Fconv and recording information to complete an offline calculation process required for distributed signature, according to the requirements of an online business, synchronizing, by each node, a view information v, and taking out a calculation result stored in the view, when signature service is provided online, and meantime starting, by each node, another thread to continuously perform the step of repeating to produce an intermediate result needed in a signature, reading, by each node, information for which signature is required to be calculated, and then completing signature calculation according to the intermediate result, and generating a signature result sigi, wherein i is the node number, and transmitting, by each node, the sigi to a selected assembly node, and completing, by the assembly node, signature assembly to generate the signature result SIG after receiving the transmitted information.

In one embodiment, in the performing step, implementation of the Fconv function depends on the homomorphic encryption algorithm, which encrypts and decrypts a secret by the public-private key pair (HEpuki, HEptki). In another embodiment, in the converting step, the step of converting the information that cannot be directly disclosed in the calculation process to publicly available information, further includes performing several rounds of calculations and communications by each node according to the distributed signature algorithm.

In one embodiment, in the performing step, operating the function Fconv and sending the result to the corresponding node after the information has been converted, and receiving information from other nodes further includes storing the intermediate result in the view information if all the information has been converted and transmitted, or, continuing to convert and transmit the information by the Fconv function until all information processing is completed if there is still information to be converted and transmitted.

In one embodiment, in the transmitting step, the signature assembly generated signature result SIG is the signature information corresponding to the public key PUK, which can be used to verify the SIG.

In some embodiments, the methods disclosed herein can applied to a digital asset wallet APP or a digital asset transaction wallet system for security enhancement and digital asset management, and where parties whose interests are not related can jointly manage digital assets and respectively act as the signature nodes and complete the overall signature process.

In one embodiment, a threshold distributed elliptic curve key generation and signature system includes a plurality of nodes of a computing network, each node having a key generation module configured to generate its own public-private key pairs (puki, ptki) independently without the participation of a trust center, where puki is the public key, ptki is the private key, and i is a node number, a conversion module configured to process the public-private key pair key pairs according to a secret sharing protocol to complete the conversion of a (n, n) threshold to a (t, n) threshold, a mapping module configured to generate a private key of (t, t) threshold according to a threshold logic to complete a mapping of ptki to ptki' after determination of t signature nodes, and a signature module configured to complete, communicate and calculate the node, in a signature protocol with ptki' according to signature logic, and store a result of the calculation completing an overall signature.

In one embodiment, the mapping module includes a receiving unit configured to receive the public keys and private key shares sent by all other nodes, a sending unit configured to broadcast the public keys to other nodes and send the private key shares to the corresponding nodes according to the secret sharing protocol, and a recovery unit configured to generate the final public key according to an elliptic curve operation with the public key received by the sending unit, and generate a new private key according to the recovery method in the secret sharing protocol with the private key shares received by the sending unit.

In some embodiments, the secret sharing protocol is Shamir protocol or Asmuth-Bloom protocol.

In one embodiment, the signature module includes a first unit configured to perform a child thread 1 for generating homomorphic public-private key pair, perform a secret conversion by Fconv function, and send the converted information to the corresponding node or receive the converted information from other nodes.

In one embodiment, the child thread 1 is configured to store the intermediate result in the view information if all the information has been converted and transmitted, or, to continue to convert and transmit the information by the Fconv function until all information processing is completed if there is still information to be converted and transmitted.

In one embodiment, implementation of the Fconv function depends on a homomorphic encryption algorithm, which encrypts and decrypts the secret by the public-private key pair.

In one embodiment, the signature module further includes a second unit configured to perform a child thread 2 for synchronizing the view information, read the intermediate calculation result under the view information, complete the calculation related to the signature message, and generate a local signature sigi and broadcast the signature to other nodes.

In some embodiments, the system is configured to be applied to a digital asset wallet APP or a digital asset transaction wallet system for security enhancement and digital asset management, where parties whose interests are not related can jointly manage digital assets, respectively act as the signature node, and complete the overall signature process.

BRIEF DESCRIPTION OF THE DRAWINGS

The disclosure is more fully appreciated in connection with the following detailed description taken in conjunction with the accompanying drawings, in which.

DETAILED DESCRIPTION

Example embodiments will now be described hereinafter with reference to the accompanying drawings, which form a part hereof and which illustrate example embodiments which may be practiced. As used in the disclosures and the appended claims, the terms "embodiment", "example embodiment", and "exemplary embodiment" do not necessarily refer to a single embodiment, although they may, and various example embodiments may be readily combined and interchanged, without departing from the scope or spirit of example embodiments. Furthermore, the terminology as used herein is for the purpose of describing example embodiments only and is not intended to be limitations. In this respect, as used herein, the term "in" may include "in" and "on", and the terms "a," "an" and "the" may include singular and plural references. Furthermore, as used herein, the term "by" may also mean "from", depending on the context. Furthermore, as used herein, the term "if" may also mean "when" or "upon," depending on the context. Furthermore, as used herein, the words "and/or" may refer to and encompass any and all possible combinations of one or more of the associated listed items. It will be appreciated by those of ordinary skill in the art that the embodiments disclosed herein can be embodied in other specific forms without departing from the spirit or essential character thereof. The presently disclosed embodiments are therefore considered in all respects to be illustrative and not restrictive.

Figure 1:
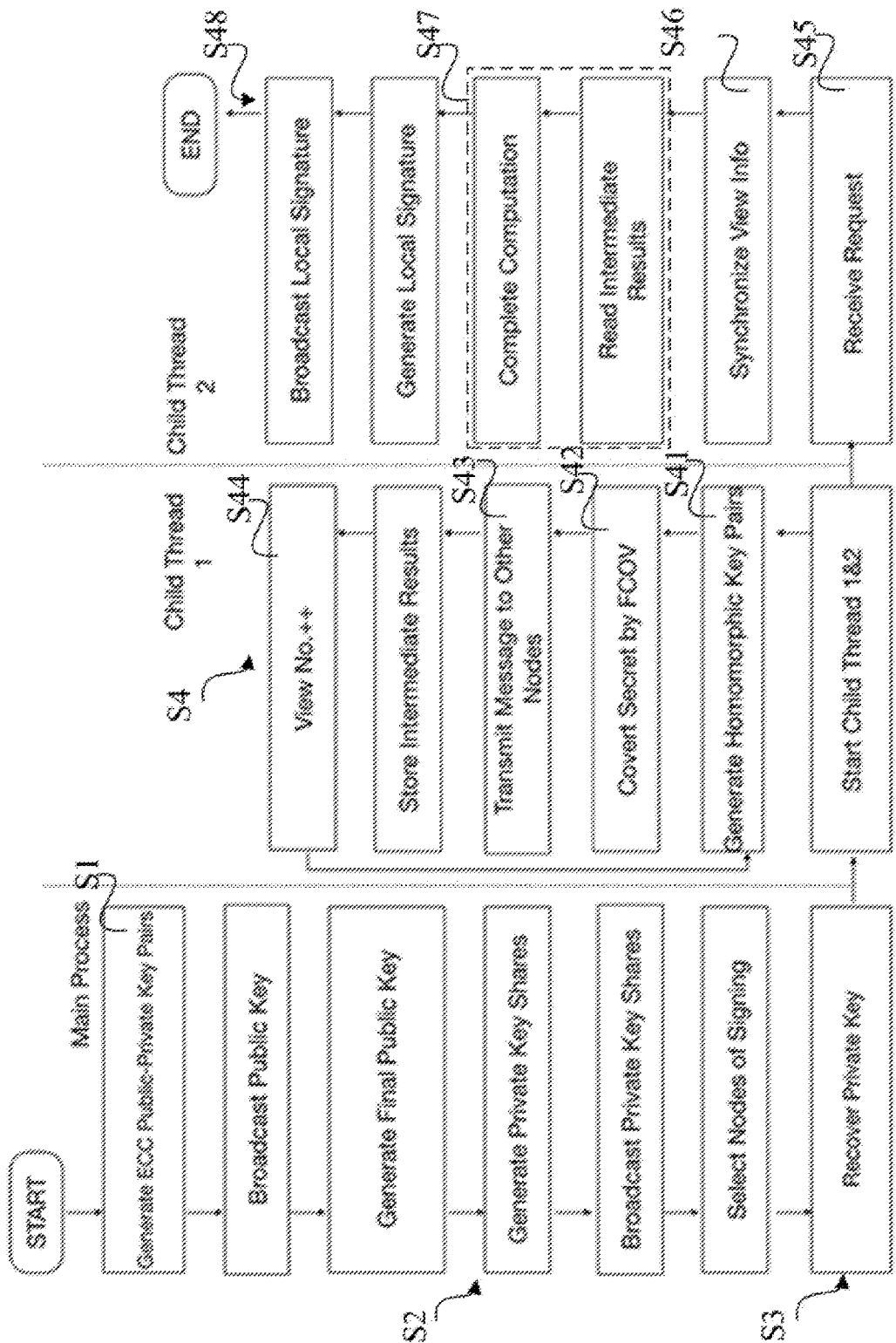
FIG. 1 is a schematic diagram of a threshold distributed elliptic curve key generation and signature method according to one embodiment of the present disclosure.

FIG. 1 is a schematic diagram of a threshold distributed elliptic curve key generation and signature method according to one embodiment of the present disclosure. As can be appreciated, the threshold distributed elliptic curve key generation and signature method can be carried out using computing devices having one or more processors and one or more computer-readable storage media having stored therein computer-executable instructions for causing the one or more processors, when programmed thereby, to perform the operations and steps disclosed herein. The plurality of computing devices can be provided within a computing network.

In one embodiment, a threshold distributed elliptic curve key generation and signature method includes the following steps, among others.

Step S1, generating, by each of n nodes of computing network, a public-private key pair (puki, ptki) independently without the participation of a trust center, where puki is a public key, ptki is a private key, and i is a node number.

Step S2, processing, by each node, the key pair according to a secret sharing protocol to complete the conversion of a (n, n) threshold to a (t, n) threshold.

Step S3, generating, by each signature node, a private key of (t, t) threshold according to a threshold logic to complete a mapping of ptki to ptki' after determination oft signature nodes.

Step S4, completing, by each node, communication and calculation of that node in a signature protocol with ptki' according to a signature logic, and storing a result of the calculation and completing an overall signature. These steps will be discussed in more details below.

In order to satisfy the requirement of online high concurrency and high efficiency, the method of this present disclosure calculates and stores the results of calculations that are not related to the signed message m in the signature process in advance, and keep all nodes and maintain a unified view. When the service is provided online, each node just needs to complete the calculation related to message m, take out the intermediate result in the same view, and complete the final signature assembly.

In the S2 step, the secret sharing protocol (SSP) to be used may be Shamir SSP or Asmuth-Bloom SSP.

In one embodiment, after the conversion step, each node will have its own public key and private key shares.

In another embodiment, in the Step S2 processing step, the method of completing the conversion of a (n, n) threshold to a (t, n) threshold includes the following steps:

Generating, by each node, the public-private key pair (puki, ptki) independently according to a rule of elliptic curve, where puki is a public key, ptki is a private key and i is anode number.

Broadcasting, by each node, its public key puki to other nodes, and combining n public keys pukx into a complete public key PUK according to an elliptic curve operation after receiving the public keys pukx broadcasted by other n−1 nodes.

Performing, by each node, (t, n) threshold processing on its private key ptki according to the secret sharing protocol to map ptki to n segments ptkij, and sending ptkij to a corresponding node numbered j.

Lastly, selecting t available nodes, when a signature is performed, and recovering, by each of the t available nodes, the received n ptkij according to a recovery method of the selected secret sharing protocol to obtain ptki'.

In this embodiment, the selected t available nodes are the nodes for signature, and are therefore called the signature nodes. And the ptki' corresponds to the ptki during the mapping process.

After the mapping of ptki to ptki' of t signature nodes in Step S3, the Step S4 of completing the communication and calculation according to the signature logic, storing a result of the calculation and completing an overall signature includes the following steps:

Step S41, generating, by each of the n nodes on a computing network, a public-private key pair (HEpuki, HEptki) for homomorphic encryption by adopting a unified homomorphic encryption algorithm HE, according to a distributed signature algorithm, where HEpuki is a public key, HEptiki is a private key, and i is a node number.

Step S42, converting, by all nodes, information that cannot be directly disclosed in a calculation process to publicly available information by using a unified secret transform function Fconv, according to the calculation process of the elliptic curve signature algorithm.

Step S43, performing, by each node, the function Fconv and sending a result to a corresponding node after the information has been converted, and receiving information from other nodes.

Step S44, recording, by each node, information in the S43 Step of performing the function Fconv that is not related to the signed information but is used in the signature generation, according to a flow of the elliptic curve signature algorithm, and maintaining, by each node, a unified view number v.

Step S45, repeating the steps of converting information, performing the function Fconv and recording information (e.g., repeating the steps S42 to S44) to complete an offline calculation process required for distributed signature, according to requirements of an online business.

Step S46, synchronizing, by each node, a view information v, and taking out a calculation result stored in the view, when signature service is provided online, and meantime starting, by each node, another thread to continuously perform the step of repeating to produce an intermediate result needed in a signature.

Step S47, reading, by each node, information for which signature is required to be calculated, and then completing signature calculation according to the intermediate result, and generating a signature result sigi, where i is the node number.

Step S48, transmitting, by each node, the sigi to a selected assembly node, and completing, by the assembly node, signature assembly to generate the signature result SIG after receiving the transmitted information.

In one embodiment, in Step S43, the implementation of the Fconv function depends on the homomorphic encryption algorithm, which encrypts and decrypts a secret by the public-private key pair (HEpuki, HEptki).

In another embodiment, the step of converting the information that cannot be directly disclosed in the calculation process to publicly available information further includes performing several rounds of calculations and communications by each node according to the distributed signature algorithm.

In one embodiment, in Step S43 of operating the function Fconv and sending the result to the corresponding node after the information has been converted, and receiving information from other nodes further comprises storing the intermediate result in the view information if all the information has been converted and transmitted, or, continuing to convert and transmit the information by the Fconv function until all information processing is completed if there is still information to be converted and transmitted.

In one embodiment, in the transmitting step of S48, some node is selected as assembly node and the transmitted sigi is used, by each assembly node, to generate the signature result SIG. The SIG is the signature information corresponding to the public key PUK can be used to verify the SIG.

In one embodiment, the methods disclosed herein may be applied to a digital asset wallet APP or a digital asset transaction wallet system for security enhancement and digital asset management, where parties whose interests are not related jointly manage digital assets, and can respectively act as the signature node and perform to complete the overall signature process.

Figure 2:
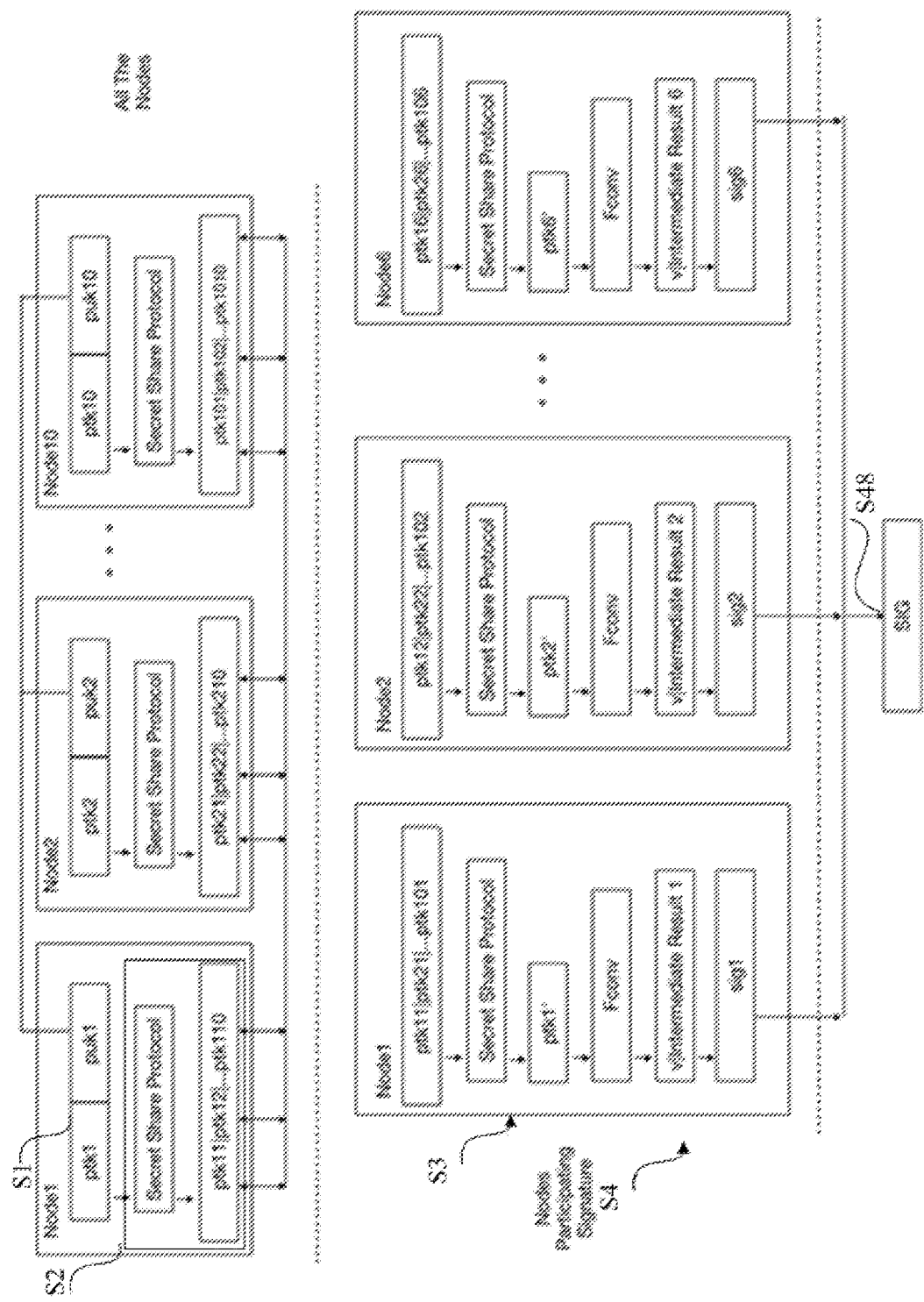
FIG. 2 is a schematic diagram depicting a distributed key generation and signature for a (6,10) threshold according to one embodiment of the present disclosure.

In order to explain the principle of the (t, n) threshold in detail, FIG. 2 shows a diagram depicting an example of distributed key generation and signature for a (6, 10) threshold. As shown in the figure, there are a total of 10 nodes in which 6 nodes, labeled from 1 to 6, are chosen to participate in the signature process. Each of the 10 nodes generates a public-private key pair (puki, ptki) separately similar to that described above, where puki is a public key, ptki is a private key, and i is the node label. The public key is then broadcasted to the other nodes, and the private key is processed according to a common secret sharing protocol. Each private key is processed into 10 shares, and then each is distributed to the corresponding node. Next, each of the selected 6 nodes can first recover the private key by the 10 shares (9 are received, 1 is saved by themselves), according to the SSP. Then, according to the common Fconv conversion function, the secret information in the signature process can be converted into information that can then be sent to other nodes, and the converted information is subsequently transmitted and received. Finally, each node generates its own local signature based on the object being signed and broadcasts it to the other nodes to assemble the final signature.

As can be appreciated, the distributed key generation and signature for a (6, 10) threshold described herein can be carried out using computing devices having one or more processors and one or more computer-readable storage media having stored therein computer-executable instructions for causing the one or more processors, when programmed thereby, to perform the operations and steps disclosed herein. For example, each of the 10 total nodes may be separate, individual computing devices while each of the 6 nodes chosen to participate in the signature process may also be separate, individual computing devices or they may be on the same computing devices as each of the 10 nodes. The plurality of computing devices can be provided within a computing network.

Figure 3:
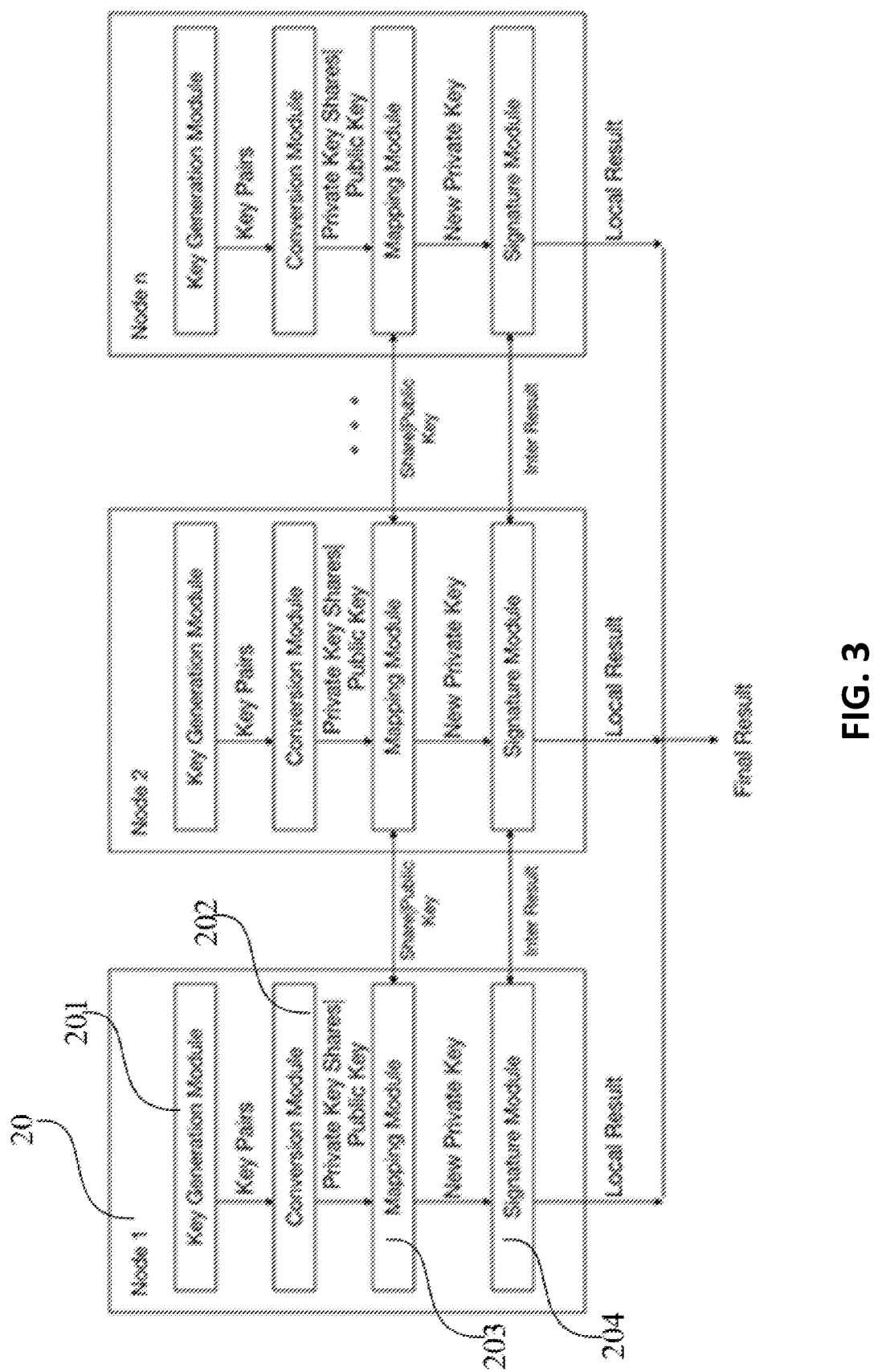
FIG. 3 is a schematic diagram of a threshold distributed elliptic curve key generation and signature method according to one embodiment of the present disclosure.

FIG. 3 is a schematic diagram of a threshold distributed elliptic curve key generation and signature system according to one embodiment of the present disclosure. As can be appreciated, the threshold distributed elliptic curve key generation and signature system can be carried out using computing devices having one or more processors and one or more computer-readable storage media having stored therein computer-executable instructions for causing the one or more processors, when programmed thereby, to perform the operations and steps disclosed herein. The plurality of computing devices can be provided within a computing network.

In one embodiment, the system includes a plurality of nodes 20, each node 20 having a key generation module 201, which is configured to generate its own public-private key pairs (puki, ptki) independently without the participation of a trust center. In this embodiment, puki is the public key, ptki is the private key, and i is a node number.

In one embodiment, the system further includes a conversion module 202, which is configured to process the key pairs according to a secret sharing protocol (SSP) to complete the conversion of a (n, n) threshold to a (t, n) threshold.

In one embodiment, the system further includes a mapping module 203, which is configured to generate a private key of (t, t) threshold according to a threshold logic to complete a mapping of ptki to ptki' after determination of t signature nodes.

In one embodiment, the system further includes a signature module 204, which is configured to complete, communicate and calculate the node, in a signature protocol with ptki' according to signature logic, and store a result of the calculation completing an overall signature.

In some embodiments, the conversion module 202 can be configured with Shamir SSP or Asmuth-Bloom SSP.

Figure 4:
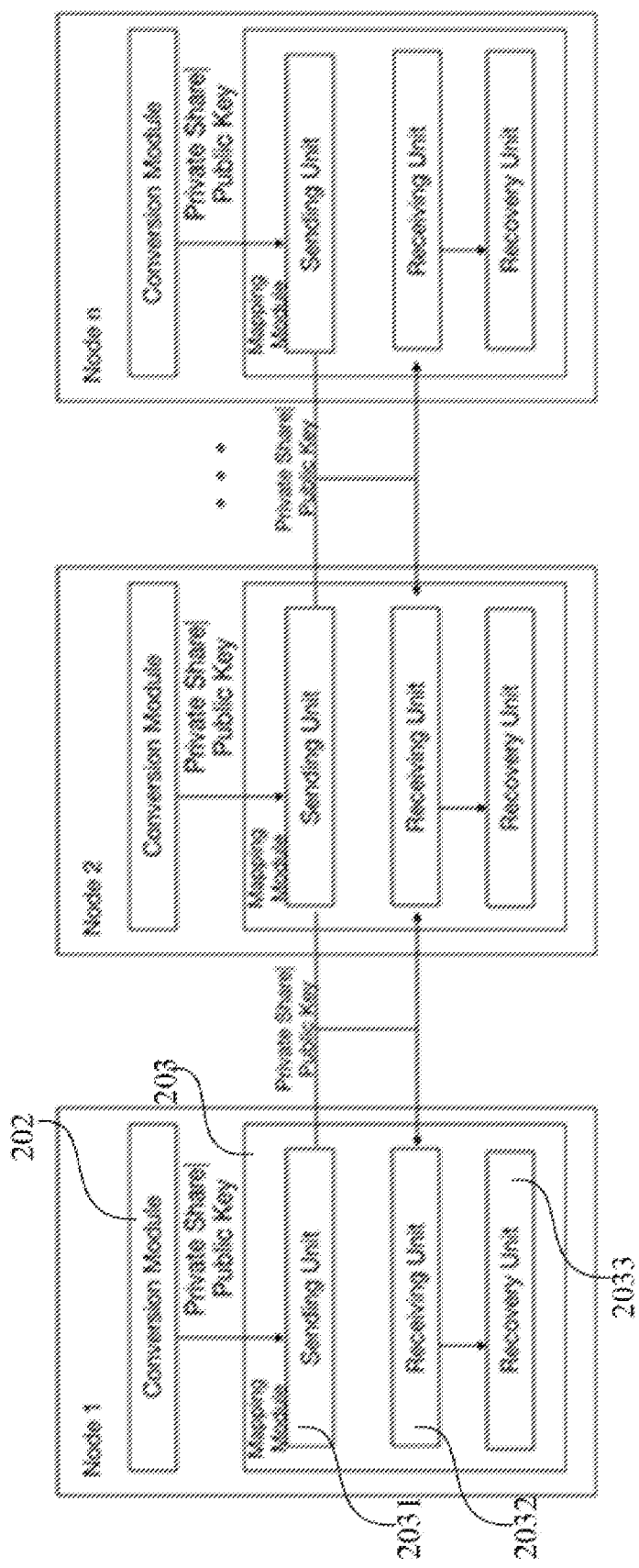
FIG. 4 is a schematic diagram of a mapping module according to according to one embodiment of the present disclosure.

FIG. 4 is a schematic diagram of a mapping module 203 of the threshold distributed elliptic curve key generation and signature system according to one embodiment of the present disclosure. In one embodiment, the mapping module 203 includes a receiving unit 2032 configured to receive the public keys and private key shares sent by all other nodes. The mapping module 203 also includes a sending unit 2031 configured to broadcast the public keys to other nodes and send the private key shares to the corresponding nodes according to the secret sharing protocol. In one embodiment, the mapping module 203 also includes a recovery unit 2033 configured to generate the final public key according to the elliptic curve operation with the public key received by the sending unit, and generate a new private key according to the recovery method in the secret sharing protocol with the private key shares received by the sending unit.

Figure 5:
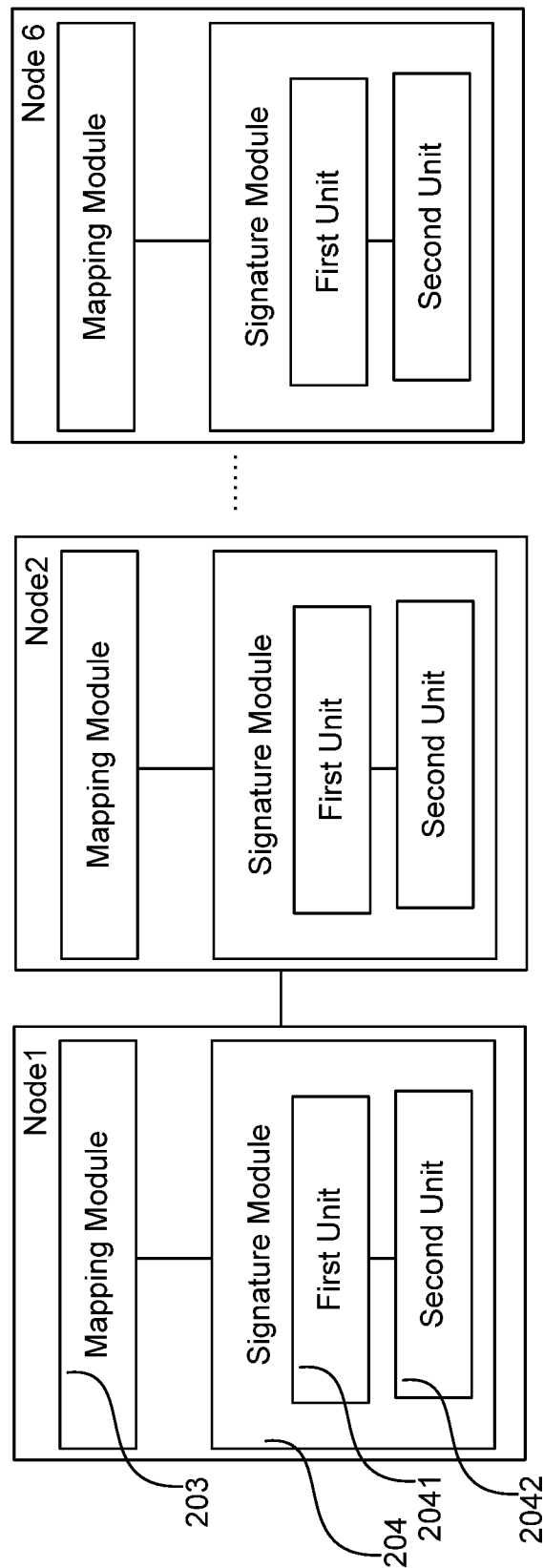
FIG. 5 is a schematic diagram of a signature module according to one embodiment of the present disclosure.

FIG. 5 is a schematic diagram of a signature module 204 of the threshold distributed elliptic curve key generation and signature system according to one embodiment of the present disclosure. In one embodiment, the signature module 204 includes a first unit 2041 configured to perform a child thread 1 for generating homomorphic public-private key pair, to perform a secret conversion by Fconv function, and to send the converted information to the corresponding node or receiving the converted information from other nodes. The child thread 1 can be configured to store the intermediate result in the view information if all the information has been converted and transmitted, or, continue to convert and transmit the information by the Fconv function until all information processing is completed if there is still information to be converted and transmitted. The implementation of the Fconv function depends on the homomorphic encryption algorithm, which encrypts and decrypts the secret by the public-private key pair.

In another embodiment, the signature module 204 further includes a second unit 2042 configured to perform a child thread 2 for synchronizing the view information, to read the intermediate calculation result under the view information, to complete the calculation related to the signature message, and to generate a local signature sigi and broadcast the signature to other nodes.

In some embodiments, the system of this present disclosure can be applied to a digital asset wallet APP or a digital asset transaction wallet system for security enhancement and digital asset management, where all parties whose interests are not related can jointly manage digital assets, respectively act as the signature node and perform the overall signature process.

The foregoing descriptions of specific embodiments of the disclosure are presented for purposes of illustration and description. They are not intended to be exhaustive or to limit the disclosure to the precise forms disclosed; obviously, many modifications and variations are possible in view of the above teachings. The embodiments were chosen and described in order to best explain the principles of the disclosure and its practical applications; they thereby enable others skilled in the art to best utilize the disclosure and various embodiments with various modifications as are suited to the particular use contemplated. Notably, not every benefit described herein need be realized by each embodiment of the disclosure; rather any specific embodiment can provide one or more of the advantages discussed above. It is intended that the following claims and their equivalents define the scope of the disclosure.

While various embodiments in accordance with the disclosed principles have been described above, it should be understood that they have been presented by way of example only, and are not limiting. Thus, the breadth and scope of the example embodiments described herein should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "about," "near," "proximate to," and "adjacent to" shall mean sufficiently close to have a material effect upon the respective system element interactions.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A threshold distributed elliptic curve key generation and signature method, comprising:

providing, on a computing network, one of a digital asset wallet application or a digital asset transaction wallet system, wherein the digital asset wallet application and the digital asset transaction wallet system each have enhanced security enabling parties, comprising one or more t signature nodes whose interests are not related, to jointly access and manage digital assets of the wallet application or the transaction wallet system;

generating, by each of n nodes via one or more generation modules of the computing network, a public-private key pair (puki, ptki) independently without the participation of a trust center, wherein puki is a public key, wherein ptki is a private key, and wherein i is a node number;

processing, by each node of the n nodes via one or more conversion modules of the computing network, the public-private key pair according to a secret sharing protocol to complete the conversion of a (n, n) threshold to a (t, n) threshold in which t represents a threshold number of nodes required to reconstruct a secret private key;

generating, by each of the t signature nodes, respectively, via one or more mapping modules of the computing network, a private key of (t, t) threshold according to a threshold logic to complete a mapping of ptki to ptki' after determination of t signature nodes, wherein ptki' refers to a reassembled private key which is recombined from n segments of private key shares determined according to t signature nodes; and completing, by each of the t signature nodes via one or more signature modules of the computing network, communication and calculation of each of the signature nodes in a signature protocol with ptki' according to a signature logic, and storing a result of the calculation in order to complete an overall signature process for the digital asset wallet application or the digital asset transaction wallet system, wherein in the completing step, completing the overall signature process comprises:

generating, by each of the t signature nodes on the computing network, a public-private key pair (HEpuki, HEptki) for homomorphic encryption by adopting a unified homomorphic encryption algorithm according to a distributed signature algorithm, wherein HEpuki is a public key and HEptki is a private key;

converting, by each of the t signature nodes, secret information that cannot be directly disclosed in a calculation process to publicly available information by using a unified secret transform function Fconv according to a calculation process of an elliptic curve signature algorithm, wherein implementation of the function Fconv depends on the public-private key pair for homomorphic encryption;

performing, by each of the t signature nodes, the function Fconv by applying the Fconv to the secret information;

sending, by each of the t signature nodes, a result of performing the function Fconv to a corresponding t signature node after the information has been converted, and receiving, by each of the t signature nodes, converted information from other t−1 nodes;

recording, by each of the t signature nodes, received converted information by storing the converted information as unified view information v;

repeating the steps of converting, performing and recording to complete an offline calculation process required for generating distributed signatures, according to the requirements of an online business;

synchronizing, by each of the t signature node, the view information v, wherein a calculation result stored in the view information is retrieved when a signature service is provided online;

starting, by each of the t signature node, another thread to continuously perform the step of repeating to produce an intermediate result needed in a signature;

reading, by each of the t signature nodes, information for which a signature is required to be calculated, and then completing, by each of the t signature nodes, signature calculation according to the intermediate result by generating a local signature result sigi;

transmitting, by each of the t signature node, the sigi to a selected assembly node, and completing, by the assembly node, signature assembly to generate a final signature result SIG after receiving the transmitted sigi from each of the t signature nodes; and applying the final signature result SIG to the information for which the signature was required.

2. The method of claim 1, wherein in the processing step, to complete the conversion of the (n, n) threshold to the (t, n) threshold comprises:

generating, by each of the t signature nodes, the public-private key pair independently according to a rule of elliptic curve key generation;

broadcasting, by each of the t signature nodes, the respective public key puki to other t signature nodes on the computing network, and combining n public keys pukx into a complete public key PUK according to an elliptic curve operation after receiving the public keys pukx broadcasted by other n−1 signature nodes;

performing, by each of the t signature node, the (t, n) threshold processing on the respective private key ptki according to the secret sharing protocol to map ptki to n segments of ptkij, wherein n segments of ptkij refers to n shares of the private key ptki generated by dividing ptki according to t signature nodes;

sending, by each of the t signature nodes, the n segments of ptkij to a corresponding t signature node on the computing network; and selecting t available nodes, when a signature is performed, and recovering, by each of the t available nodes, the received n ptkij according to a recovery method of the secret sharing protocol to obtain ptki'.

3. The method of claim 2, wherein in the transmitting step, the signature assembly generated signature result SIG is the signature information corresponding to the public key PUK, which can be used to verify the SIG.

4. The method of claim 1, wherein the secret sharing protocol is Shamir protocol or Asmuth-Bloom protocol.

5. The method of claim 1, wherein in the performing step, implementation of the Fconv function depends on the homomorphic encryption algorithm, which encrypts and decrypts a secret by the public-private key pair (HEpuki, HEptki).

6. The method of claim 1, wherein in the converting step, the step of converting the secret information that cannot be directly disclosed in the calculation process to publicly available information, further comprises performing several rounds of calculations and communications by each of the t signature nodes according to the distributed signature algorithm.

7. The method according to claim 1, wherein in the performing step, operating the function Fconv and sending the result to the corresponding t signature node after the information has been converted, and receiving information from other t−1 signature nodes further comprises storing the converted information of all t signature nodes as intermediate results in the view information when all the information has been converted and transmitted.

* * * * *